(12) United States Patent
Reichwein et al.

(10) Patent No.: US 7,383,768 B2
(45) Date of Patent: Jun. 10, 2008

(54) RAPID PROTOTYPING AND FILLING COMMERCIAL PIPELINE

(75) Inventors: David P. Reichwein, Elizabethtown, PA (US); Timothy B. Burk, York, PA (US); C. Timothy Fickes, Lancaster, PA (US); Matthew S. Myers, Lititz, PA (US); Sunil Ramachandra, Lancaster, PA (US)

(73) Assignee: AWI Licensing Company, Wilmington, DE (US)

( * ) Notice: Subject to any disclaimer, the term of this patent is extended or adjusted under 35 U.S.C. 154(b) by 160 days.

(21) Appl. No.: 11/092,502

(22) Filed: Mar. 29, 2005

(65) Prior Publication Data

US 2005/0247216 A1 Nov. 10, 2005

(51) Int. Cl.
*B41F 19/02* (2006.01)
*G06F 19/00* (2006.01)

(52) U.S. Cl. .............................. 101/3.1; 101/6; 101/23; 101/36; 700/98

(58) Field of Classification Search ................. 101/23, 101/3.1, 6, 28, 36; 700/98
See application file for complete search history.

(56) References Cited

U.S. PATENT DOCUMENTS

| | | | | |
|---|---|---|---|---|
| 3,655,312 A | * | 4/1972 | Erb et al. .................... 425/115 |
| 3,887,678 A | * | 6/1975 | Lewicki, Jr. ................. 264/284 |
| 5,448,282 A | * | 9/1995 | Imai et al. ................... 347/213 |
| 5,803,888 A | * | 9/1998 | Severs et al. ............... 493/210 |
| 5,976,689 A | * | 11/1999 | Witt et al. ................... 428/339 |
| 6,182,546 B1 | * | 2/2001 | Hecker .......................... 83/56 |
| 6,368,539 B1 | * | 4/2002 | Greenfield et al. ......... 264/284 |
| 6,447,503 B1 | * | 9/2002 | Wynne et al. ................. 606/9 |
| 6,568,324 B1 | * | 5/2003 | Franklin et al. ............ 101/364 |
| 6,585,369 B1 | | 7/2003 | Sievert et al. .............. 347/105 |
| 6,617,009 B1 | | 9/2003 | Chen et al. ................. 428/195 |
| 6,694,872 B1 | * | 2/2004 | LaBelle et al. ............... 101/23 |
| 6,838,035 B1 | * | 1/2005 | Ederer et al. ............... 264/308 |
| 6,846,172 B2 | | 1/2005 | Vaughn et al. .............. 425/363 |
| 7,090,910 B2 | * | 8/2006 | Courtoy et al. ............. 428/158 |
| 2002/0103719 A1 | | 8/2002 | Beedy ......................... 705/26 |
| 2003/0224128 A1 | | 12/2003 | Ylitalo et al. .............. 428/32.1 |
| 2005/0020422 A1 | | 1/2005 | Betti et al. .................... 492/56 |
| 2005/0103456 A1 | * | 5/2005 | Hein et al. .................. 162/117 |
| 2006/0136083 A1 | * | 6/2006 | Hansson et al. .............. 700/98 |

* cited by examiner

*Primary Examiner*—Daniel J. Colilla
*Assistant Examiner*—Kevin D Williams

(57) ABSTRACT

Methods and apparatus provide a means to rapidly develop and modify prototype surface coverings for customer review and approval, and fill the commercial pipeline while more conventional production equipment is obtained, installed and tested. The present apparatus to rapid prototype and fill the commercial pipeline includes a digital printing system to print a film and a press for laminating and embossing the printed film to a substrate. The press uses an embossing plate or roll, which is made from ebonite or by three-dimensional printing equipment. These plates and rolls can be produced within two or three days or less.

8 Claims, 3 Drawing Sheets

RAPID PROTOTYPING AND FILLING COMMERCIAL PIPELINE

This invention is directed to rapid prototyping and filling the commercial pipeline with printed and mechanically embossed surface coverings, particularly floor coverings.

BACKGROUND OF THE INVENTION

Developing new designs for surface coverings, by producing a prototype to show a potential customer prior to making a mass produced product available, is expensive and typically takes three months or more. This is mainly due to the cost and time to develop print cylinders and embossing cylinders.

Customers are demanding shorter and shorter development times and more input into the final design of the product. It would be advantageous to have a means to quickly (within a matter of days) modify a design, produce a prototype that will faithfully imitate the final product, and be capable of producing commercial quantities of the final product at a rate to meet initial commercial demand.

Current methods of prototyping surface covering are expensive, because each change in design requires the rotogravure printing cylinder and the standard embossing roll to be re-etched or re-engraved. If the surface covering is chemically embossed, any change in the chemical embossing also requires re-etching or re-engraving of the print cylinder. The process of remaking the cylinders is expensive and time consuming.

SUMMARY OF THE INVENTION

The present invention overcomes this disadvantage by using digital printing to make rapid changes in the print pattern and chemical embossing pattern. The chemical embossing pattern is created by printing a blowing agent modifier, such as a blowing inhibitor or a blowing accelerator.

The present invention also uses mechanical embossing tools that can be produced within two or three days. The embossed plates used in a stacker press are cheaper and quicker to make than the traditional mechanical embossing rolls used in the typical manufacture of tile and sheet goods. Ebonite embossing cylinders and embossing plates, and cylinders and plates made by three-dimensional printing equipment can also be made within two or three days. Therefore, the rapid prototyping of the surface covering required by the present invention is achieved.

Further, time to market is significantly shortened by using the digital printing system, stacker press, ebonite mechanical embossing cylinders and plates, or mechanical embossing cylinders and plates made by three-dimensional printing equipment to fill the commercial product pipeline. While the pipeline is being filled, the traditional rotogravure printing cylinders and mechanical embossing rolls can be made, and the less expensive to manufacture production line, which includes the rotogravure printing cylinders and mechanical embossing rolls, can be set up. Once the rotogravure printing and mechanical embossing line is up and running, the digital printing system and stacker press, ebonite embossing rolls or three-dimensional printing rolls may be used to develop another new tile or sheet goods.

In a preferred embodiment, the prototypes and commercial product which fills the commercial pipeline uses a digital printing system and an embossing system in which the embossing tool can be made within two or three days. The digital printing system permits rapid and flexible changing of the prototype design.

While the prototyping embossing systems that are envisioned produce tile at a slower rate than typical tile manufacturing lines and do not use an embossing tool having a long commercial production lifespan, the tools can be made within two or three days and are durable enough to make enough commercial product to fill the commercial pipeline and permit time to manufacture and install the standard commercial embossing tools.

DETAILED DESCRIPTION OF THE INVENTION

Figure 1:
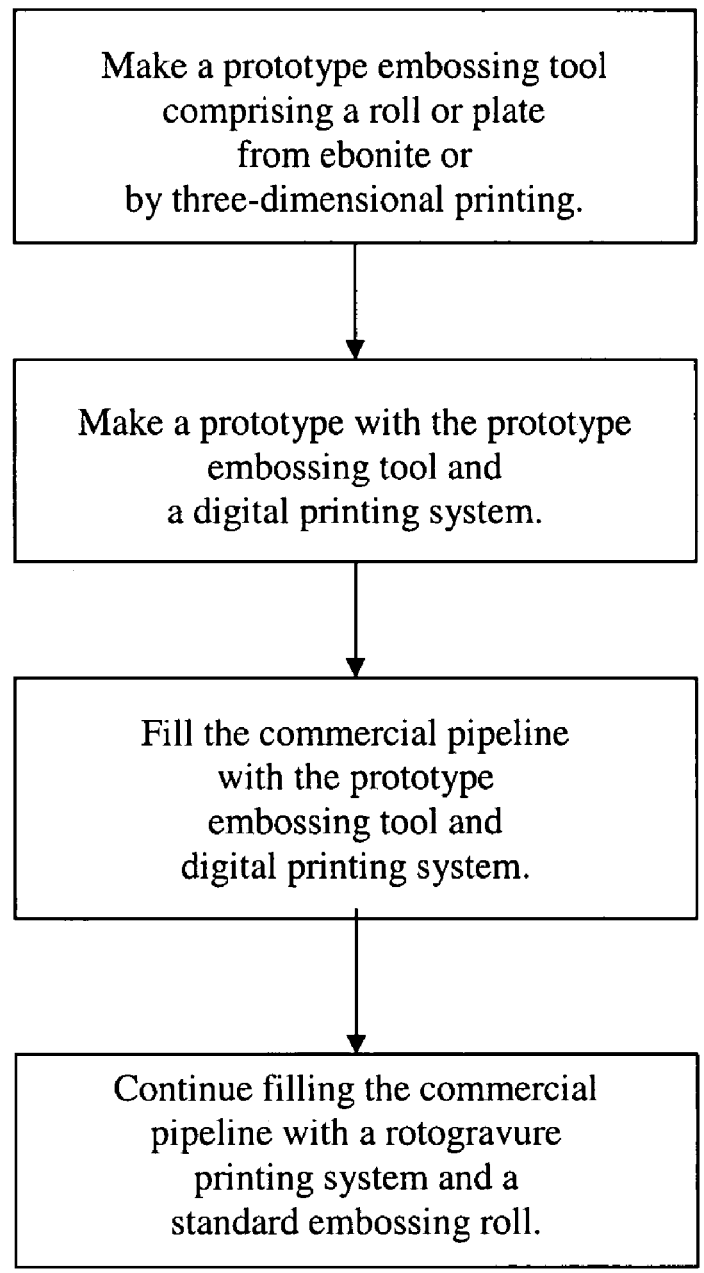
FIG. 1 is a block diagram showing one preferred method of the present invention.

One purpose of this invention is to enable the user to rapidly prototype and/or manufacture vinyl tiles T, either the standard residential type D.I.Y. vinyl tiles or luxury vinyl tiles; sheet goods S, including residential and commercial resilient flooring; and other surface coverings, particularly those that are printed and mechanically embossed. Currently, the manufacturing process utilized to develop and produce vinyl tile and sheet goods can take as long as 90 days. The present invention will significantly reduce the cycle-time to produce such vinyl tiles and sheet goods to as short as one week or less, thereby giving the user a significant marketplace advantage.

Flexography is an offset technique where the printing plates or cylinders are made from rubber or photopolymers. The printing has been accomplished by the transfer of ink from the raised surface of the printing plate to the surface of the material being printed. The rotogravure method of printing uses a print cylinder with thousands of tiny cells which are below the surface of the printing cylinder. The ink is transferred from the cells when the print cylinder is brought into contact with the media at the impression roll. Printing inks for flexography or rotogravure include solvent based inks, water based inks, and radiation cured inks. While rotogravure and flexography printing does provide acceptable image quality, these two printing methods require expensive and time-consuming preparation of print cylinders or printing plates which make printing jobs of less than 100,000 units expensive as the setup cost and the cost of the cylinders or printing plates is typically depreciated over the size of the print job. Analog printing includes rotogravure printing and flexographic printing, as well as transfer printing.

Recently, digital printing has become a viable method for the printing of information on packages. The term "digital printing" refers to the electronic digital characters or electronic digital images that can be printed by an electronic output device capable of translating digital information. The two main digital printing technologies are ink jet and electrophotography.

The introduction of piezo impulse drop-on-demand (DOD) and thermal DOD ink jet printers in the early 1980's provided ink jet printing systems. These early printers were very slow, and the ink jet nozzles often clogged. In the 1990's Hewlett Packard introduced the first monochrome ink jet printer, and shortly thereafter, the introduction of color, wide format ink jet printers enabled businesses to enter the graphic arts market. Today, a number of different ink jet technologies are being used for packaging, desktop, industrial, commercial, photographic, and textile applications.

In piezo technology, a piezo crystal is electrically excited to create pressure waves, which eject ink from the ink chamber. The ink can be electrically charged and deflected in a potential field, allowing the different characters to be created. More recent developments have introduced DOD multiple jets that utilize conductive piezo ceramic material which, when charged, increases the pressure in the channel and forces a drop of ink from the end of the nozzle. This allows for very small droplets of ink to form and be delivered at high speed at very high resolution, approximately 1,000 dpi printing.

Until recently, the use of color pigments in jet inks was uncommon. However, this is changing rapidly. Submicron pigments were developed in Japan for ink jet applications. Use of pigments allows for more temperature resistant inks required for thermal ink jet printers and laminations. Pigmented water-based jet inks and UV-curable jet inks are commercially available. Pigmented inks have greater light fastness and water-resistance.

Digital ink jet printing has the potential to revolutionize the printing industry by making short-run, color print jobs more economical. However, the next commercial stage will require significant improvements in ink jet technology; the major hurdle remaining is to improve print speed. Part of this problem is the limitation of the amount of data the printer can handle rapidly. The more complex the design, the slower the printing process. Right now they are slower than comparable digital electrostatic printers.

Figure 2A:
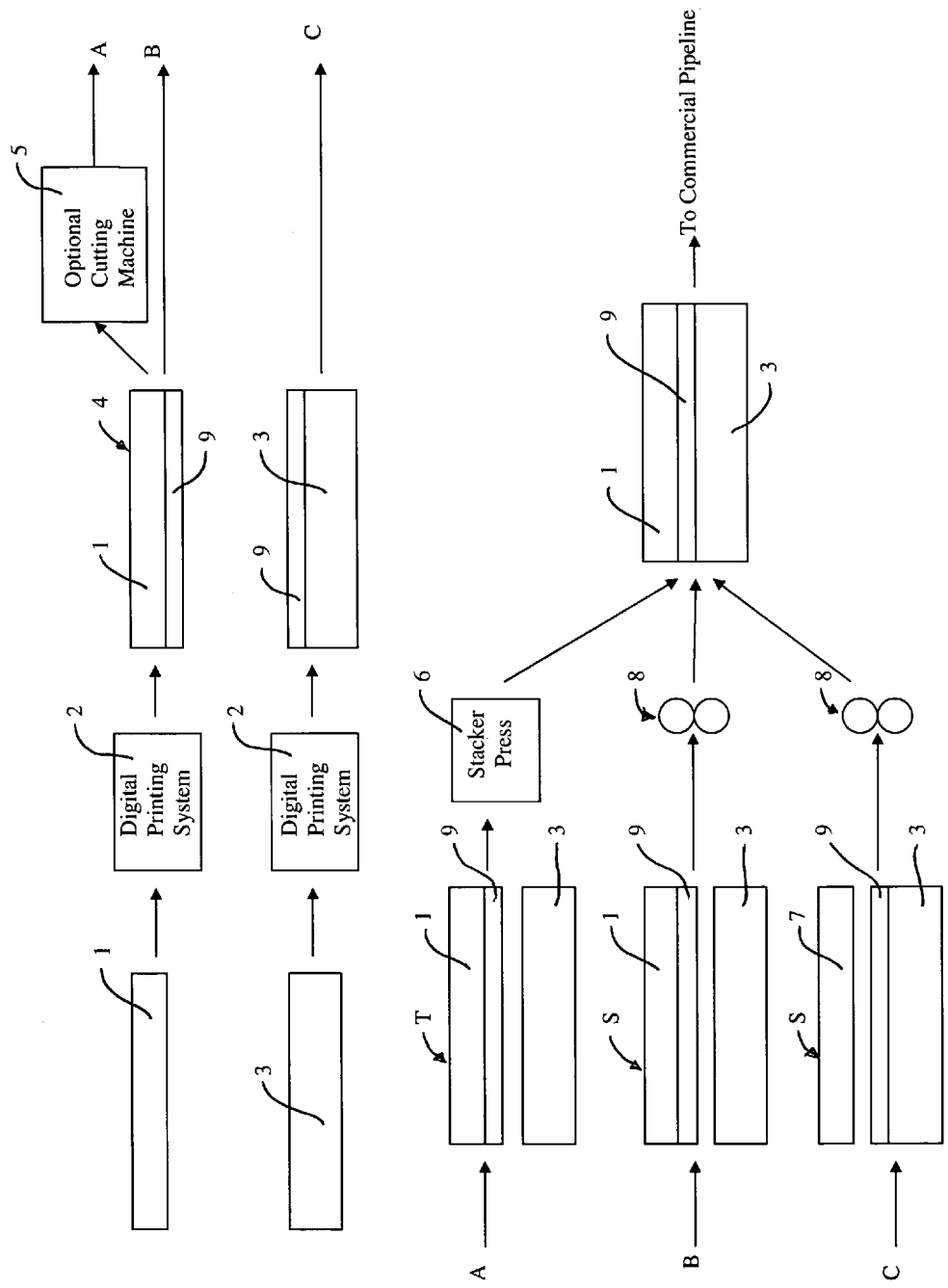
FIGS. 2A and 2B are schematic drawings showing the method of FIG. 1.
Figure 2B:
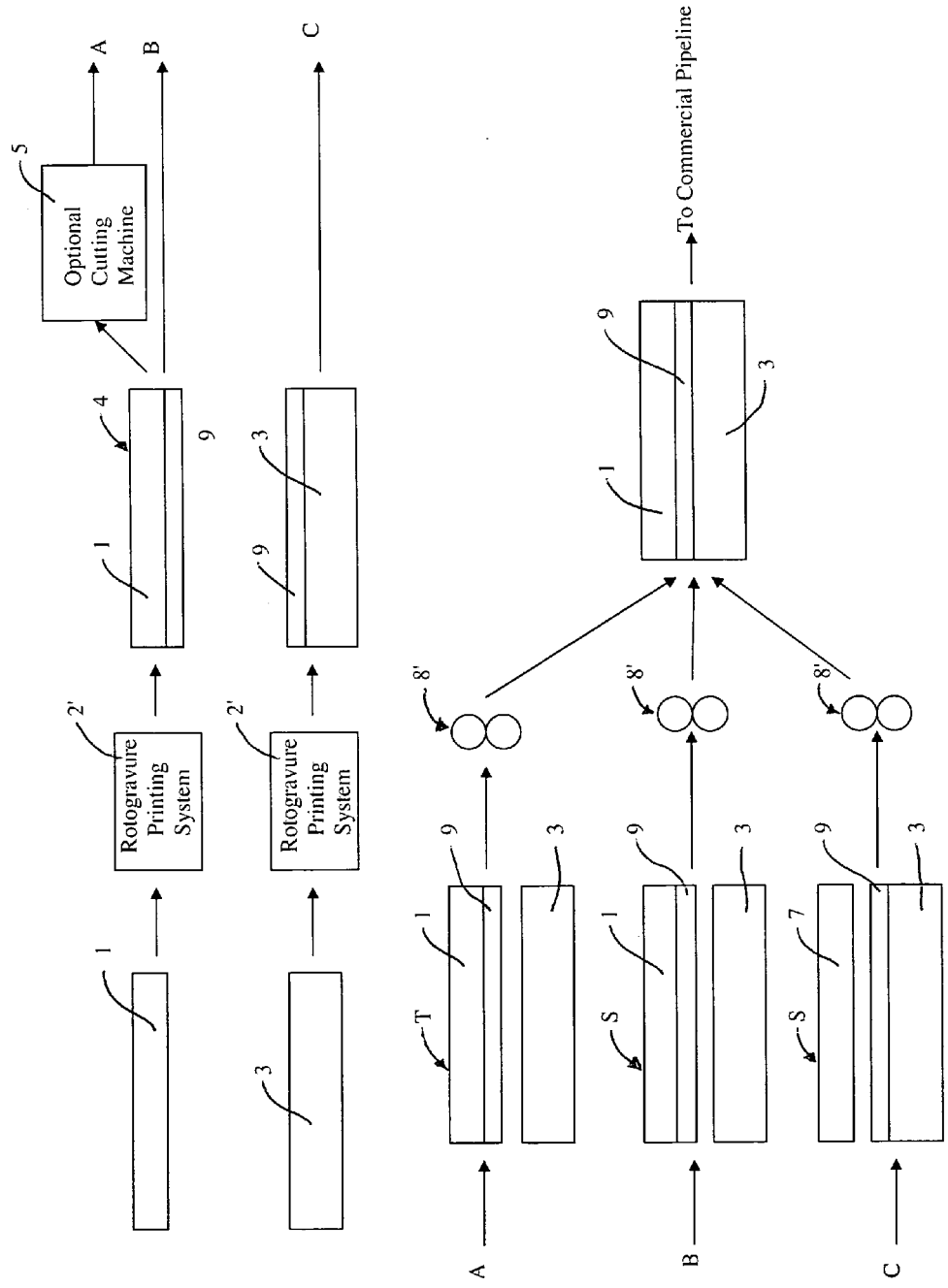

As shown in FIGS. 2A and 2B, digital printing system 2 is used to make rapid changes in the print layer 9. The method also uses mechanical embossing tools 6, 8 that can be produced in two or three days. The embossing plates used in the stacker press 6 are cheaper and quicker to make than the traditional mechanical embossing rolls 8'. Reference numerals 8 designate ebonite embossing cylinders or cylinders made by three-dimensional printing. FIG. 2A shows the equipment required to achieve the rapid prototyping of the present invention and the structure of the surface covering at various stages of the manufacture.

The equipment shown in FIG. 2A is used to make the prototypes and fill the commercial product pipeline. While the pipeline is being filled, the traditional rotogravure printing cylinders used in the rotogravure printing system 2' and mechanical embossing rolls 8' shown in FIG. 2B are made and installed, replacing the digital printing system 2 and stacker press 6 or prototype cylinders 8.

In one embodiment, a vinyl film 1, opaque white or optically clear is either surface printed or reverse printed utilizing a high speed linear array digital printing system such as the Dotrix™ Digital Print Factory or similar digital printing system 2. This is proven technology and has a high mathematical correlation on the LAB color scale to visuals produced with industry standard rotogravure methodology and inks.

The key advantage to the digital printing system 2 is significantly reduced cycle time due to digitally printing the print layer 9 directly to substrate 3 or film 1 versus having to engrave printing cylinders for rotogravure printing and then using standard rotogravure printing methods to print the substrate or film. Also, changeover times of the manufacturing process using digital printing is instantaneous and, the range of visuals that can be produced is constrained only by the density of the ink jet arrays and memory storage capacity of the CPU's running the digital print engine.

In one embodiment, the printed vinyl film 4 is cut to size using an appropriate cutting machine 5. The cut to size film is then fed into a stacker press 6 which uses heat and pressure for an appropriate amount of time to consolidate or laminate the printed film layer 4 to an upper surface wear layer film and a lower surface vinyl base layer or substrate 3. In the stacker press, multiple embossing plates simultaneously emboss and laminate or consolidate multiple tiles.

The construction of the vinyl tile consists of, but is not limited to an upper optically clear wear layer 1, 7, a digitally printed layer 9 on a white film or an optically clear reverse printed film, and a pre-extruded and calendared PVC base layer or substrate 3. The stacker press 6 utilized in the manufacture of this vinyl tile can utilize a laser triangulation registration system. The embossing plates are used as the upper platens in the stacker press 6.

After the stacker pressing operation, the material is sent to a high speed cutter, which can be either an ultrasonic or a standard knife based punch press, where the vinyl tiles are cut to the specified dimensions for the finished product. If required, the vinyl tile can be subsequently processed for various visual enhancements such as, but not limited to, beveled or decorative edges. As a final step, the vinyl tile can be back coated with a self-stick adhesive and a release paper applied using industry standard coating methods.

The stacker press is used in China. While labor intensive, it permits the use of a plurality of embossing plates that can be engraved within two or three days or less. The press is filled with multiple surface covering substrates, including print layers and wear layers. These multiple surface covering substrates are simultaneously embossed and laminated.

As shown in Vaughn et al. U.S. Pat. No. 6,846,172 (Vaughn) and Betti et al. US Patent Application Publication No. U.S. 2005/0020422 (Betti), both of which are incorporated by reference, it is known to form embossing rolls 8 using ebonite as the embossing surface. Ebonite is a hard, moldable rubber with more than 20 percent of its weight being sulfur. Neither Vaughn nor Betti suggest that the ebonite embossing roll can be manufactured within two or three days, or that such a roll has a lifespan considerably less than standard embossing rolls that are preferred for the embossing of surface coverings.

The embossing rolls 8 can also be made by free form fabrication or three-dimensional printing. These methods have been predominantly employed in the field of rapid tool making to create tools and dies, either directly by printing a binder onto a metal powder, followed by sintering and infiltration, or indirectly by using rapid prototyping to create a pattern to form the tool by using stereolithography followed by investment casting.

In outline, three-dimensional printing uses additive processes to create a physical geometry directly from a CAD file. The predominant three-dimensional printing technologies include stereolithography, selective laser sintering, three-dimensional printing to print starch, ABS rubber, plastic or other materials, fused deposition modeling, laminated object manufacturing, and the solider process. As used herein, the term "three-dimensional printing" is intended to include all of the above-mentioned technologies.

In the technique of stereolithography, fluid photosensitive resins are solidified by exposure to ultraviolet laser illumination. Selective laser sintering uses the laser-induced fusion of a polymer or polymer-coated powder.

Three-dimensional printing uses an ink-jet to print binder onto a powder. Fused deposition modeling involves the extrusion of a thermoplastic material. In laminated object manufacturing, sheets of paper are cut by a laser beam. The solider technique uses ultraviolet light to cure one layer of photosensitive resin at a time as opposed to other stereolithographic techniques that treat one point in a layer at a time.

Three-dimensional printing permits the rolls to be made by in two or three days or less. However, the embossing rolls formed by three-dimensional printing have a relatively short lifespan, particularly when compared with standard embossing rolls.

As shown in FIGS. 2A and 2B, the manufacturing process outlined above will allow the user to rapidly develop and produce vinyl tiles T, sheet goods S and other surface coverings having unique visual characteristics. This will allow the user to display prototype goods to potential customers more rapidly. If approved by the customer, the goods can be manufactured using the process to fill the commercial pipeline while more commercially and economically viable processes are set up to continue the commercial manufacture of the goods.

The invention claimed is:

1. A method of rapid prototyping and manufacture of surface coverings having a substrate, a print layer and a wear layer, the method comprising:
   a. producing a prototype surface covering using a digital printing system to print the print layer and a press to emboss the wear layer, wherein the press comprises an embossing tool selected from the group consisting of an embossing plate and an embossing roll, the embossing tool made by three-dimensional printing, and
   b. using the digital printing system and press to fill the commercial product pipeline.

2. The method of claim 1, wherein the wear layer comprises a film and the press simultaneously laminates the wear layer to the substrate and embosses the wear layer.

3. The method of claim 2, wherein the digital printing system prints the print layer onto the film and the printed film is laminated to the substrate with the print layer adjacent the substrate.

4. The method of claim 1, wherein the press is a stacker press comprising a plurality of embossing plates and the surface covering is laminated and embossed in the stacker press.

5. The method of claim 1, wherein the wear layer is applied to the printed substrate, the wear layer is cured, and the cured wear layer is embossed.

6. The method of claim 1, further comprising replacing the digital printing system and press with a rotogravure printing cylinder and a standard embossing roll after the commercial pipeline is filled to continue production of commercial product.

7. The method of claim 1, further comprising applying a blowing agent modifier to the substrate with the digital printing system.

8. The method of claim 1 further comprising continuing to fill the commercial product pipeline using a rotogravure printing system for printing the substrate and an embossing roll made other than from ebonite or by three-dimensional printing.

* * * * *